(12) United States Patent
Greer (10) Patent No.: US 10,099,751 B1
(45) Date of Patent: *Oct. 16, 2018

(54) RECREATIONAL CANOPY

(71) Applicant: Lawrence A Greer, Bay Minette, AL (US)

(72) Inventor: Lawrence A Greer, Bay Minette, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,617

(22) Filed: Dec. 19, 2017

Related U.S. Application Data (63) Continuation-in-part of application No. 15/656,706, filed on Jul. 21, 2017, now Pat. No. 9,849,940.

(51) Int. Cl.
| | |
|---|---|
| *B63B 17/02* | (2006.01) |
| *E04H 15/06* | (2006.01) |
| *E04H 15/58* | (2006.01) |
| *A47C 7/66* | (2006.01) |
| *B60J 11/00* | (2006.01) |

(52) U.S. Cl.
CPC ............ *B63B 17/02* (2013.01); *E04H 15/06* (2013.01); *E04H 15/58* (2013.01); *A47C 7/66* (2013.01); *B60J 11/00* (2013.01)

(58) Field of Classification Search
CPC ....... E04H 15/02; E04H 15/06; E04H 15/322; E04H 15/40; E04H 15/44; E04H 15/58; E04H 2015/328; B63B 17/02; A47C 7/66
See application file for complete search history.

(56) References Cited

U.S. PATENT DOCUMENTS

| | | | |
|---|---|---|---|
| 494,333 | A | 3/1893 | Hill |
| 3,371,671 | A | 3/1968 | Kirkham |
| 3,394,720 | A | 7/1968 | Moss |
| D218,923 | S | 10/1970 | Shafer |
| 4,068,673 | A | 1/1978 | Bernardi |
| 4,300,798 | A | 11/1981 | Musgrove et al. |
| 4,641,883 | A | 2/1987 | Kato |
| 5,287,872 | A | 2/1994 | Anderson |
| 5,638,849 | A | 6/1997 | Scott |
| 6,227,557 | B1 | 5/2001 | Perret |

(Continued)

FOREIGN PATENT DOCUMENTS

| | | |
|---|---|---|
| AT | 412891 | 8/2005 |
| DE | 10134314 | 1/2003 |

(Continued)

*Primary Examiner* — David R Dunn
*Assistant Examiner* — Danielle Jackson
(74) *Attorney, Agent, or Firm* — George L Williamson (57) ABSTRACT

Method and apparatus for an improved recreational canopy which may be used with watercraft, or other structures, wherein the canopy is constructed by using a pair of flexible, resilient rod-like members wherein one end of each of the flexible rods is inserted through mating apertures in an upright support member mounted onto the watercraft, or other structure, so that the rods are bowed outwardly and frictionally held in the stanchion. A canopy, which may be constructed of solar cell fabric, is attached between the rods so that the canopy generally appears to be in an elongated V-shaped structure which stretches across a portion of the supporting structure, such as a watercraft, between the flexible rods. The upper end of the upright support member may be pivotable and the rod-like members may be disposed in a cap removably disposed on the upper end of the upright support member.

14 Claims, 5 Drawing Sheets

(56) References Cited

U.S. PATENT DOCUMENTS

| | | | |
|---|---|---|---|
| D461,160 S | 8/2002 | Araki | |
| 6,827,094 B1 | 12/2004 | Bramwells | |
| 6,845,780 B2 | 1/2005 | Bishirjian | |
| 6,926,355 B2 | 8/2005 | Le Gette et al. | |
| 6,968,800 B1 | 11/2005 | Becht | |
| 7,392,816 B2 | 7/2008 | Porter et al. | |
| 7,549,432 B2 | 6/2009 | Sherts | |
| 7,690,390 B2 | 4/2010 | Hopkins et al. | |
| 7,789,097 B1 | 9/2010 | Sotirkys et al. | |
| 8,393,343 B2 | 3/2013 | VanVonderen | |
| 8,479,756 B1 | 7/2013 | Tieskotter et al. | |
| 8,757,185 B1 | 6/2014 | Muzzio | |
| 8,783,329 B2 | 7/2014 | Hsieh | |
| 8,800,469 B2 | 8/2014 | Musacchio | |
| 8,991,410 B2 | 3/2015 | Surek et al. | |
| 8,991,411 B1 | 3/2015 | Neuman | |
| 9,194,152 B1 | 11/2015 | Plasencia | |
| 9,714,068 B1 | 7/2017 | Greer | |
| 2008/0048413 A1 | 2/2008 | Salinas et al. | |
| 2008/0196754 A1 | 8/2008 | Saiz | |
| 2011/0155196 A1 | 6/2011 | Wu | |
| 2012/0103377 A1 | 5/2012 | Sheridan | |
| 2014/0041703 A1 | 2/2014 | Funston | |
| 2015/0237975 A1 | 8/2015 | Ng | |

FOREIGN PATENT DOCUMENTS

| | | |
|---|---|---|
| DE | 102009020795 | 11/2010 |
| FR | 2884844 | 10/2006 |
| WO | WO 2015 044380 | 4/2015 |

RECREATIONAL CANOPY

RELATED APPLICATIONS

This application is a Continuation-in-Part of U.S. patent application Ser. No. 15/656,706 filed on Jul. 21, 2017.

BACKGROUND OF THE INVENTION

Field of the Invention

The present invention relates generally to canopies and, more particularly, is concerned with a canopy for recreational use on a watercraft, however, the canopy could be mounted on other separate structures, e.g., a chair or in the ground.

Description of the Related Art

Devices relevant to the present invention have been described in the related art, however, none of the related art devices disclose the unique features of the present invention.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a canopy for recreational use including a watercraft wherein the canopy is constructed by using a pair of flexible, fiberglass rod-like members wherein one end of each of the flexible members is inserted through mating apertures in an upright member or stanchion mounted onto the watercraft so that the rod-like members are bowed outwardly and frictionally held in the stanchion. The canopy may be attached between the rod members by using rings or similar devices placed through eyelets in the canopy so that the canopy generally appears to be in an elongated, somewhat V-shaped structure which stretches across a portion of the watercraft between the flexible members. The canopy may also be disposed on the rod members by inserted the rods through sleeves disposed on the edges of the canopy. The canopy is rotatable around the stanchion and the height of the canopy can be adjusted up and down using apertures or the like in the stanchion. Also shown is a cross member running between the flexible rod members so as to provide support underneath the canopy near the middle of the flexible rods. The canopy may be entirely or partially constructed of solar cell fabric. Additionally, there is shown a line attached to a rear end of the canopy so that a hand of a user can grasp the line or the canopy directly and rotate the canopy around the upright member or stanchion so that the canopy can be positioned in a favorable position suitable to the user and so that the user can freely cast a rod and reel from underneath the canopy of the present invention without hitting the canopy support. The upper end of the stanchion may be pivotable and the rod-like members may be disposed in a cap removably disposed on the upper end of the stanchion.

An object of the present invention is to provide a recreational canopy for various uses such as for use on a watercraft. A further object of the present invention is to provide a recreational canopy which can be easily assembled and disassembled and which can be packaged and sold as a kit. A further object of the present invention is to provide a canopy on a watercraft which can be easily adjusted by a user. A further object of the present invention is to provide a canopy on a watercraft which allows a user to cast a rod and reel from underneath the canopy without hitting a canopy support. A further object of the present invention is to provide a canopy for a watercraft which can be raised and lowered and rotated about an upright member used to mount the canopy on the watercraft. A further object of the present invention is to provide a canopy for a watercraft which can be easily operated by a user. A further object of the present is to provide a canopy for a watercraft which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 watercraft
14 upright support
15 tip of upright support
16 canopy
18 first flexible rod 20 second flexible rod
22 ferrule
24 cross member
26 T connector
27 connector pin
28 ring
30 eyelet
32 end of rod
33 member
34 aperture
36 aperture
38 aperture
40 aperture
42 surface of watercraft
44 base
45 fastener
46 rotatable portion
47 rod holder
48 mount for upright support
49 pole mounting portion
50 aperture
52 pin
54 line
56 hardware or cleat
58 ground
60 fisherman/user
61 chair
62 rod and reel
64 lure and line
66 sleeve
68 hole for rod
70 solar cell fabric
72 photovoltaic cells
74 positive polarity electrical output
76 negative polarity electrical output
77 exemplary electrical connector/barrel connector
78 hand of user
80 angle
82 electrical interconnections
84 criss-cross
86 line
88 clip
90 pedestal mounting assembly
92 seat plate
94 shaft of pedestal
96 pin of pedestal
98 deck of watercraft
100 deck mounting plate
102 socket for pin or shaft
104 receiver tube of trailer hitch
106 vehicle
108 draw bar insert portion
110 table
112 clamp
114 lower end of upright support and ground
116 cap
118 upper end of upright support
120 fastener/wing nut
122 apertures
124 enlargements
126 pivoting member
128 fastener/wing nut
130 separate upper extension
132 USB

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 11 illustrate the present invention wherein a canopy for recreational use is disclosed and which is generally indicated by reference number 10.

Figure 1:
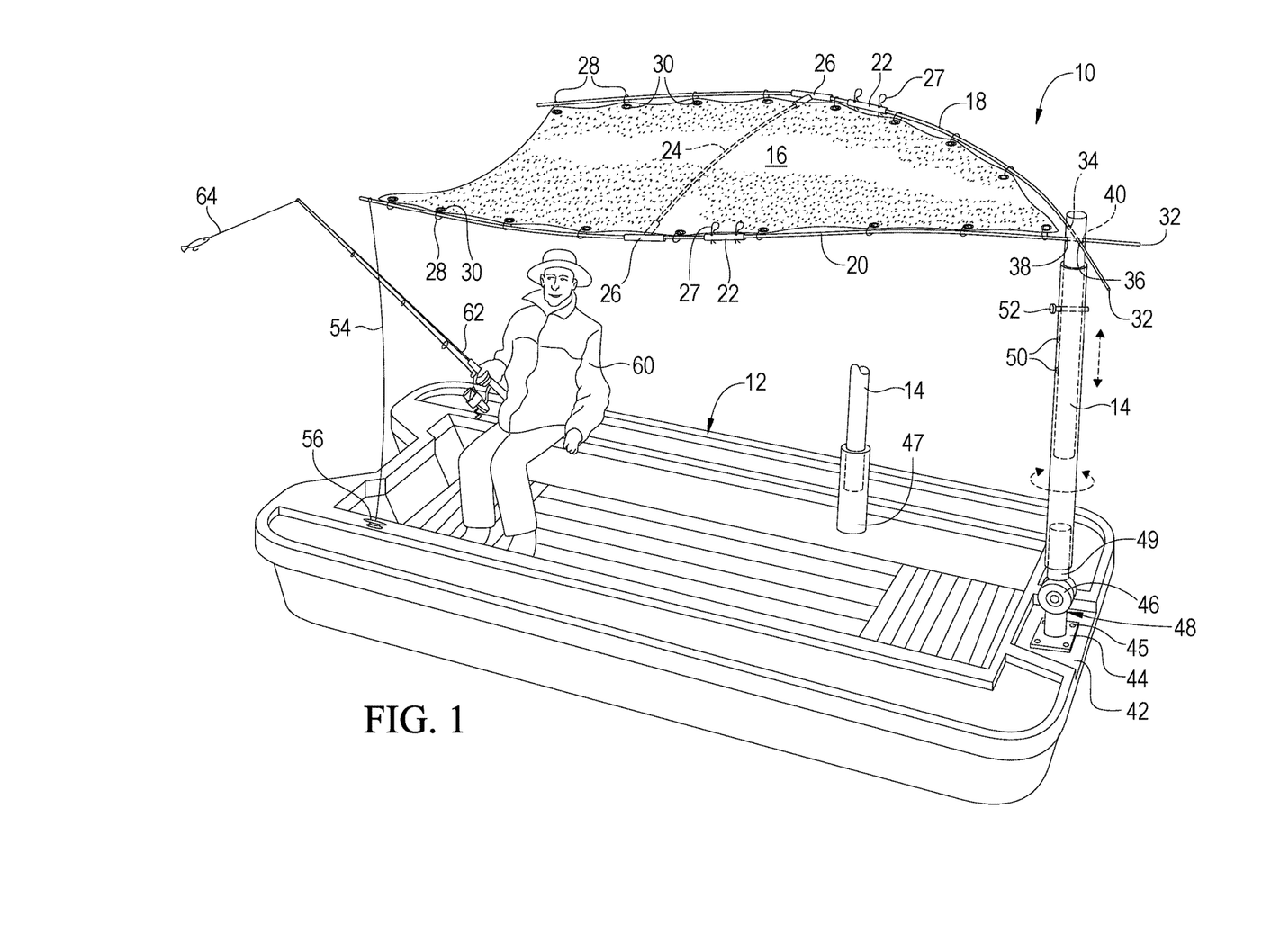
FIG. 1 is a perspective view of the present invention shown in operative connection.
Figures 2, 3, 4:
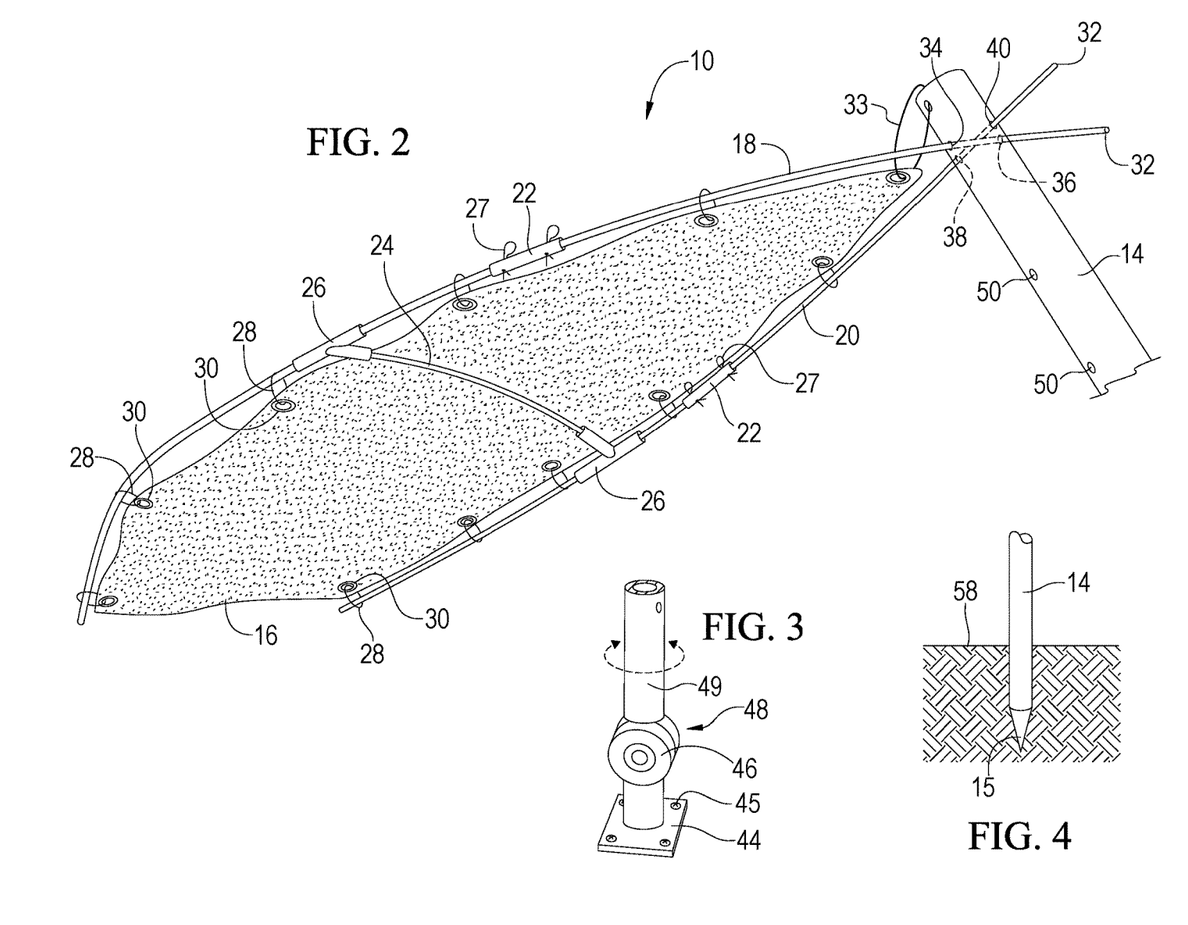
FIG. 2 is an enlarged perspective view of portions of the present invention.
FIG. 3 is a perspective view of an exemplary mounting bracket for the present invention.
FIG. 4 is an elevation view of an exemplary structure for mounting of the present invention.
Figures 5, 6, 7:
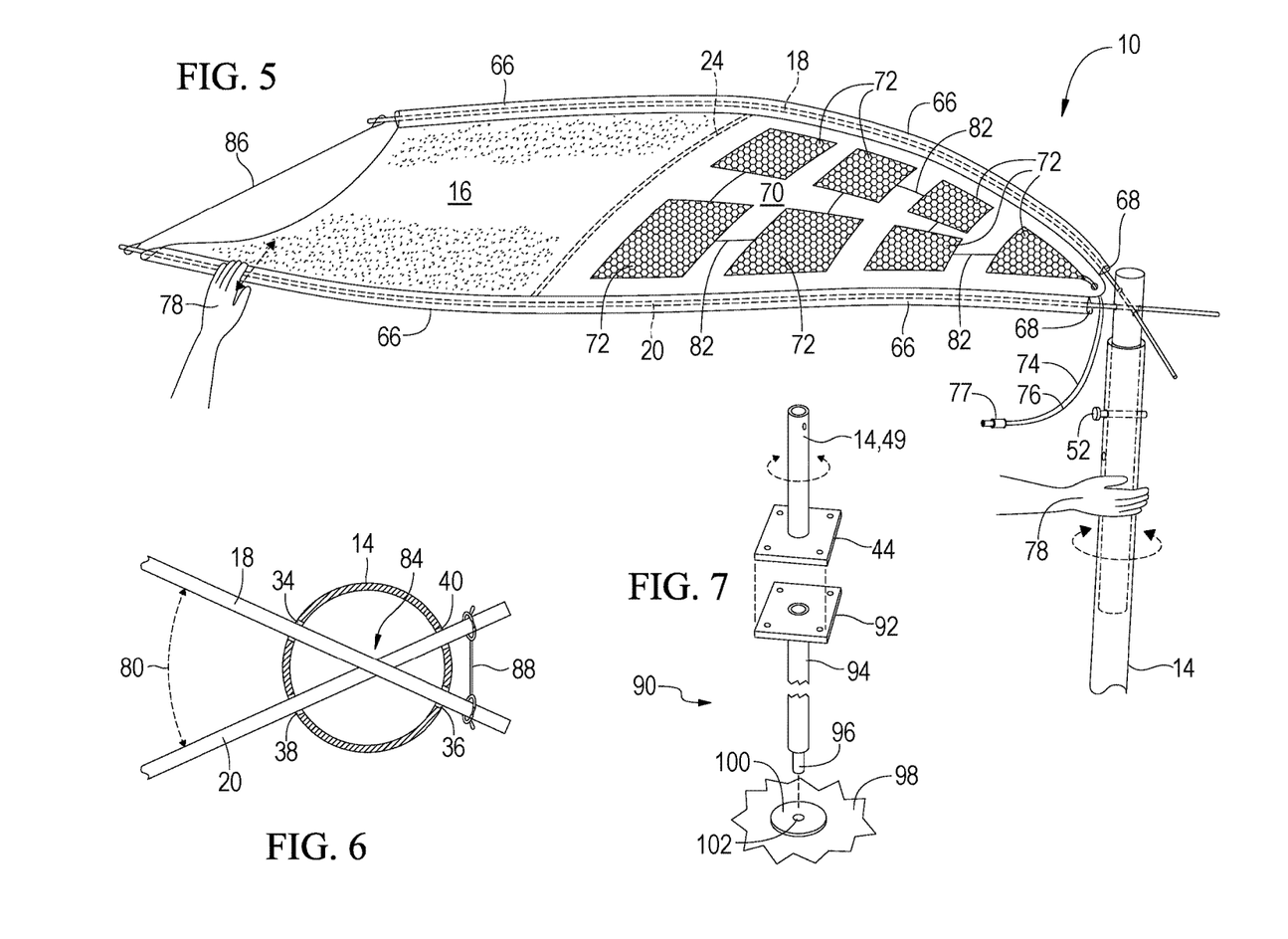
FIG. 5 is a perspective view of portions of the present invention.
FIG. 6 is a plan view of portions of the present invention.
FIG. 7 is an exploded perspective view of a typical marine mount for the present invention.

Turning to FIGS. 1 and 2, therein is shown the present invention 10 showing a watercraft 12 to which is attached an upright support post or stanchion 14 having a canopy 16 disposed thereon. The canopy 16 is supported between a first and second 18, 20 side frame members or rods which are flexible and resilient in nature similar to what a fiberglass or graphite composition rod would exhibit and the front tip of canopy 16 may be attached to upright support 14 using a piece of material or member 33. Each rod 18, 20 may be made of one piece or two pieces and a two piece unit would require a conventional ferrule or the like shown at 22 with connector pins 27 or the like in order to connect the pieces of the rod 18, 20 to each other. Also, a cross member 24 is shown underneath the canopy 16 so as to provide vertical support for the canopy in order to keep it from ripping or tearing as would be caused by wind or movement of the boat or watercraft 12 and T-connectors 26 or the like are shown on each side for connecting an end of the cross bar 24 to each of the flexible rods 18, 20. The canopy 16 is connected to the rods 18, 20 using a plurality of rings 28 passing through multiple eyelets 30 disposed near the edge of the canopy. An alternative embodiment for attaching the canopy 16 to rods 18, 20 is shown in FIG. 5. The flexible rods 18, 20 are attached to an upper end of the upright support or stanchion 14 by having an end 32 of each rod pass through respective apertures 34, 36, 38, 40 of the upright support 14. An end of rod 18 extends or passes through aperture 34, 36 and an end of rod 20 passes through aperture 38, 40 as best shown in FIG. 2. This very simple construction technique reduces the cost and time of manufacturing the present invention 10. The ends of the rod 18, 20 being under inherent resilience force are frictionally held firmly in the aperture pairs 34, 36, 38 40 as the ends 32 of the rods 18, 20 pass completely through the mating opposing walls of the upright support 14. Also shown is an up and down height adjustment mechanism for the upright member 14 wherein a plurality of apertures 50 are shown passing through the inner and outer upright support 14 so that the inner upright support is telescopically connected to the outer upright support using a plurality of apertures 50 having a pin 52 pass through a selected aperture pair as would be done in the standard manner by one skilled in the art so as to make the canopy 16 of the present invention 10 height adjustable in an up-down direction. Also shown is a line 54 which provides means to rotate the canopy 16, connected to an end of canopy 16 and having an end tied to cleat 56 which line can be used to control and thereby to reposition, move or rotate the canopy 16 about the watercraft 12 to a user selected position. Also shown is a fisherman or user 60 in boat 12 holding a rod and reel 62 in his hand with a lure and line 64 thereon illustrating how a user can cast from underneath the canopy 16 so that the rod does not hit anything during the cast. An alternate mounting means for the upright support post 14 is shown by rod holder 47 disposed on an inside wall of the boat 12 with a lower end of the post 14 inserted in the rod holder so that the post is rotatable in the rod holder. Also shown is an exemplary mounting device 48 for connecting the upright support 14 to a surface 42 of the watercraft 12 or the like wherein the mounting device has a base 44 for receiving fasteners 45 extending into the surface 42 so as to be fixed in place and a middle portion 46 which is generally pivotable and/or rotatable and a pole mounting portion 49 to which the upright support 14 is connected. Generally, it is expected that the upright support 14 would be removably fixed in place on a supporting structure, such as a watercraft 12 or rod holder 47, so that the upright support is disposed in substantially the upright position although the upright support may be permanently mounted on the supporting structure.

Turning to FIG. 3, therein is shown an enlarged exemplary mounting device 48 for connecting the lower end of upright support 14 to a surface 42 of the watercraft 12 or the like wherein the mounting device has a base 44 for receiving fasteners 45 and a middle portion 46 which is generally pivotable and/or rotatable and a pole mounting portion 49 to which the upright support 14 is connected. Many different types of mounting devices 48 could be used with upright support 14 for connection to many types of separate structures such as chairs or the like.

Turning to FIG. 4, therein is shown an enlarged view showing the lower end of the upright support 14 having a tip 15 thereon for insertion into a different support structure such as the ground 58 as would occur with sand at a beach.

Turning to FIG. 5, therein is shown an alternative embodiment of the present invention 10 showing the canopy 16 being extended or stretched between rods 18, 20 wherein the rods are each inserted into conventional sleeves 66 disposed on and extending along first and second sides or edges of the sheet of material of the canopy. Each sleeves 66 has a hole or rodhole 68 therein through which the rod 18, 20 is inserted into or removed from the sleeve and the sleeve extends substantially entirely along the edge of the canopy 16 from a front to rear end thereof. The rods 18, 20 could be one piece or two piece for easier folding and storage. Also shown on the canopy 16 is at least a portion of the sheet of material making up the canopy including solar cell fabric 70, wherein as used in this specification, the solar cell fabric 70 includes photovoltaic cells 72 attached to a surface thereof, or embedded therein, or stitched into the fabric, or built into the layers around the fiber of the fabric, or otherwise included as a part of canopy 16. The entire canopy 16 could be made of solar cell fabric 70 if so desired or the canopy could also be made so that part of the canopy has no solar cell fabric and part of the canopy has solar cell fabric. As used in this specification, photovoltaic cells are generally considered to be specialized electrical devices that convert visible light from the sun into some form of direct current electricity. Also, some photovoltaic cells can convert infrared or ultraviolet radiation into direct current electricity. Direct current electrical output wires 74, 76 from solar cell fabric 70 are also shown wherein 74 is a positive polarity output and 76 is a negative polarity output which could be approximately 12 volt however the operating current and voltage would be determined by the load. Electrical energy output from all photovoltaic cells 72 of the solar cell fabric 70 would be connected to and thereby delivered to the direct current electrical output wires 74, 76 as indicated by electrical interconnections 82. The direct current output 74, 76 could terminate in an exemplary electrical connector 77, e.g., an inline DC (direct current) barrel power plug also called a barrel connector, as shown in FIG. 5, and could be used for all purposes, for example, providing power for a USB charger to recharge cell phones, all other wireless and wired communication devices, or watercraft 12 batteries. Wires 74, 76 could be connected to all types of electrical connectors 77 including DC connectors and plugs, cylindrical and snap and lock connectors, all IEC connectors, cigar sockets and plugs, USB (universal serial bus) and HDMI connectors, pin plugs and many other types of connectors and plugs as commonly used by society and the marine industry and could be converted to AC (alternating current) current by using a converter so as to power all AC type electrical devices. Further, wires 74, 76 could be connected at 77 to many types of electrical circuits for all purposes including powering all types of electrical devices including wireless or wired devices including radios, GPS and radar systems or storing electrical energy in batteries or related devices. In short, the electrical output from wires 74, 76 could be used for any and all known purposes. Also shown is a hand 78 of a user to illustrate that a hand of a user can be used to provide means to rotate the canopy 16 and the upright support post 14 along with line 54. Also, the rear ends of the flexible, fiberglass rods 18, 20 may be squeezed inwardly toward each other and tied to each other for securement using line 86. Other previously disclosed items are also shown.

Turning to FIG. 6, therein is shown the top of the upright support post 14 showing the criss-crossed rods 18, 20 and apertures 34-40 showing the angle 80 between the rods which is expected to be in the range of about 30 to 120 degrees with respect to each other. The size of the angle 80 depends on the diameter, stiffness and resilience of rods 18, 20 wherein a larger diameter rod would require less stiffness and a smaller diameter rod would require greater stiffness to maintain the canopy in a stretched out disposition between the rods. Thus rods 18, 20 need to be effectively sized so that the rods become bowed enough to provide an effective amount of lateral tension to support the canopy in a stretched out disposition. The cross-cross portion 84 of rods 18, 20 is also shown. An optional clip 88 may be used to removably secure the front ends of rods 18, 20 in apertures 36, 40 so the rods cannot accidently become dislodged or disassembled wherein the clip has a first end removably attached to rod 18 and a second end removably attached to rod 20. In order to disassemble the present invention 10, the optional clip 88 would first be removed.

Turning to FIG. 7, therein is shown an alternative exemplary mounting device (somewhat similar to mounting device 48 of FIG. 3) using a conventional marine seat pedestal assembly 90 having a fixed or rotatable seat plate 92 on its upper end suitable for having a marine seat mounted thereon, pedestal shaft 94 and pin 96 on its lower end wherein the seat pedestal 90 is to be mounted into a receiving unit in the form of a receiving aperture or socket 102 centrally mounted in a flush mount deck or socket plate 100 which is mounted on the deck 98 of a watercraft or the like. These type mounting devices are widely used in the marine industry. Upright support 14 could be connected directly to seat plate 92 or by using base 44 or to a pole mounting portion 49 as illustrated or the like. Many different types of similar mounting devices could be used with upright support 14 for connection to many types of other separate structures including watercraft, chairs, tables or the like as mentioned elsewhere herein.

Figure 8:
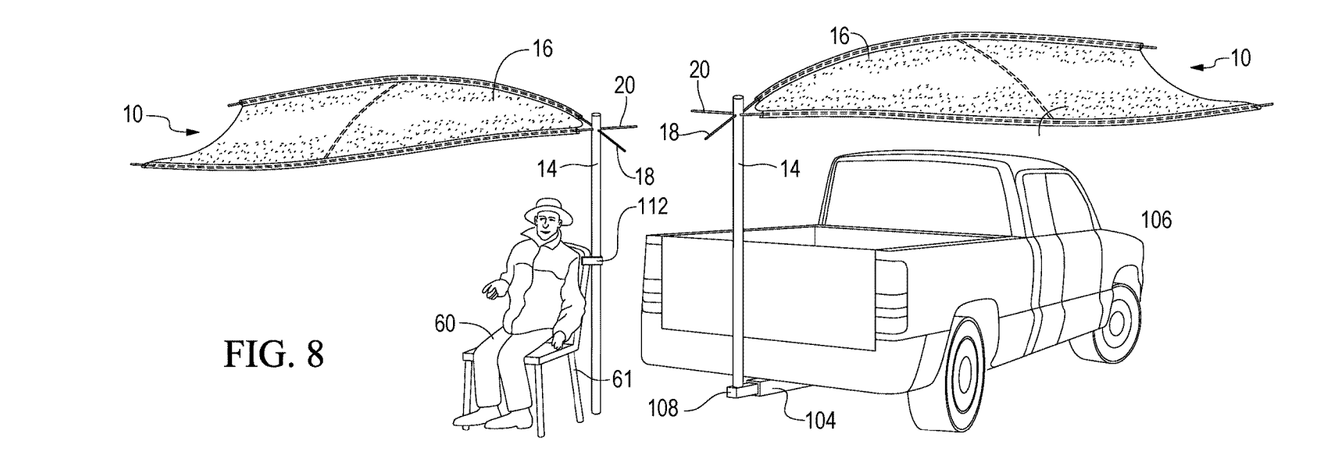
FIG. 8 is a perspective view of an exemplary structure for mounting of the present invention.

Turning to FIG. 8, therein is shown an alternative exemplary mounting structure for the present invention 10 using a conventional vehicle 106, e.g., a pickup truck as shown, wherein the upright support 14 is supported by a conventional receiver tube 104 of a trailer hitch using a draw bar insert portion 108 so that a user 60 can be shaded by canopy 16 of the present invention 10. Also shown are rods 18, 20 of the present invention 10. The lower end of the upright support 14 would be adapted to be supported on the vehicle 106 and in this example would include adapting the lower end of upright support 14 to connect to the draw bar insert portion 108. Also shown is an alternative exemplary mounting structure for the present invention 10 using a conventional chair 61 wherein the upright support 14 is supported by and attached to the chair by using a convention clamp 112 so that users could be shaded by the canopy 16 of the present invention 10.

Figure 9:
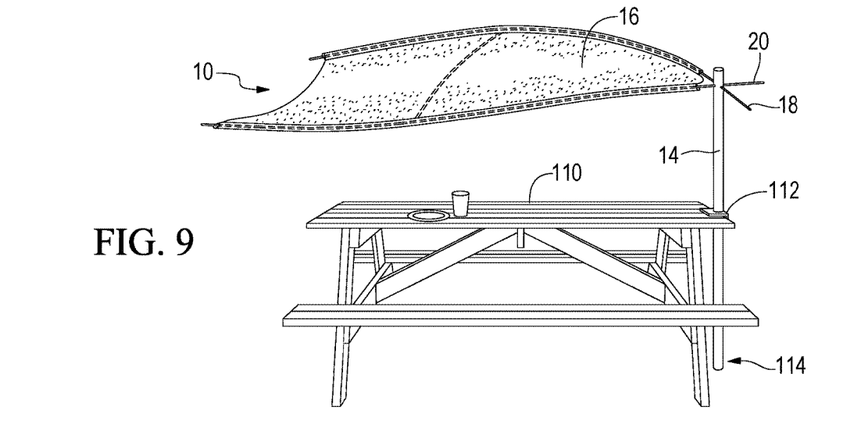
FIG. 9 is a perspective view of an exemplary structure for mounting of the present invention.

Turning to FIG. 9, therein is shown an alternative exemplary mounting structure for the present invention 10 using a conventional table 110, e.g., a picnic table as shown, wherein the upright support 14 is supported by the table by using a convention clamp 112 so that users could be shaded by the canopy 16 of the present invention 10. Also shown are rods 18, 20 of the present invention 10. The upright support 14 would be adapted to be supported by the table 110 and in this example would include adapting the upright support 14 to connect to the table by using a clamp 112 or the like, or by having the lower end of the upright support be inserted into the ground as illustrated at 114 or by both.

Figure 10:
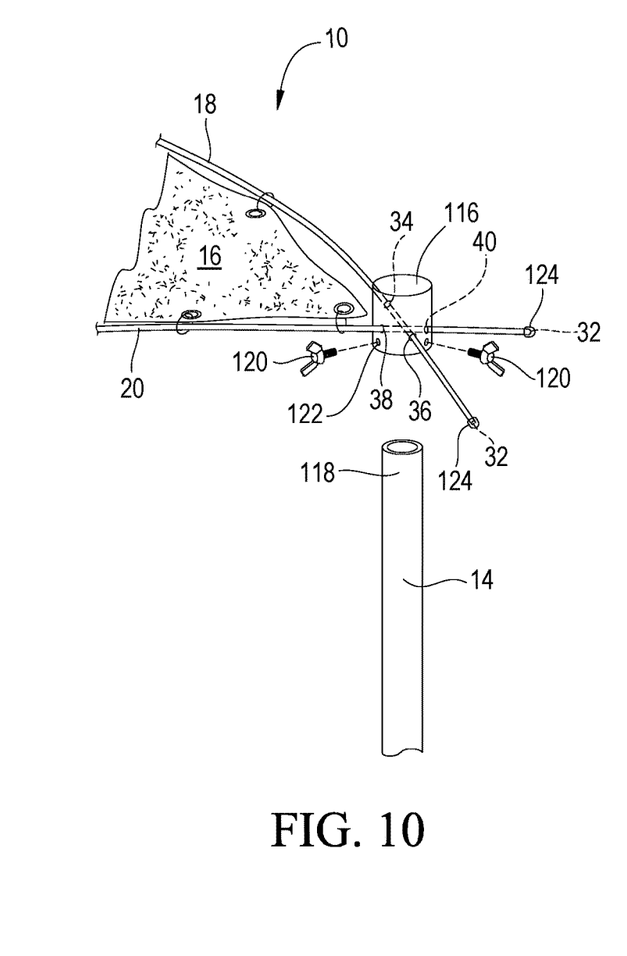
FIG. 10 is a perspective view of portions of the present invention.

Turning to FIG. 10, therein is shown an alternative embodiment of the present invention 10 showing the canopy 16 being extended or stretched between rods 18, 20 wherein the rods are each disposed on and extending along first and second sides or edges of the sheet of material of the canopy. The flexible rods 18, 20 are attached to an upper end of the upright support or stanchion 14 by having an end 32 of each rod pass through respective apertures 34, 36, 38, 40 provided in a removably secured end cap 116 on an upper end 118 of the upright support 14. An end of rod 18 extends or passes through aperture 34, 36 and an end of rod 20 passes through aperture 38, 40 as best shown in FIG. 2. Cap 116 is removably secured onto or over the upper end 118 of upright support 14 using a plurality fasteners 120, e.g., wing nuts or the like, which fasteners extend through apertures 122 which apertures extend entirely through the cap so that an end of the fastener can contact the outer surface of the upright support 14 which fasteners allow the cap to be attached to and removed from the upright support 14. This feature allows the cap 116 with canopy 16 disposed on rods 18, 20 to be attached to any type of suitable upright support 14 even a pre-existing upright support 14. Furthermore, the cap 116 with rods 18, 20 and canopy 16 may be more easily removed from the upright support 14 to make it easier to disassemble the rods and canopy from the upright support. Also shown are optional enlargements 124 being disposed on the free ends of rods 18, 20 which are used to removably secure the front ends of rods 18, 20 in apertures 36, 40 so the rods cannot accidently become dislodged or disassembled by pulling away from or through the apertures. In order to disassemble the present invention 10, the optional enlargement 124 would first be removed. Enlargement 124 may be attached to the ends of rods 18, 20 in numerous ways such as by being threaded on to the rods. Other previously disclosed items may also be shown.

Figure 11:
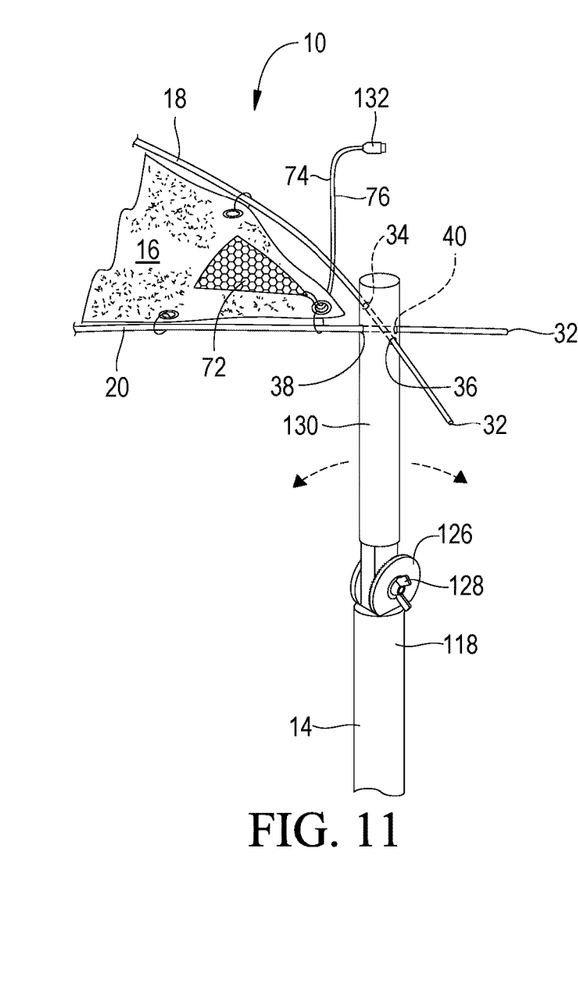
FIG. 11 is a perspective view of portions of the present invention.

Turning to FIG. 11, therein is shown an alternative embodiment of the present invention 10 showing the canopy 16 being extended or stretched between rods 18, 20 wherein the rods are attached to a separate upper extension member 130 which is attached to the upper end 118 of the upright support 14 by means of a pivoting member 126 mounted onto the upper end 118 of the upright support 14 which allows the angle between the rods 18, 20 and upper extension 130 and the upright support 14 to be adjusted and which allows the rods 18, 20 to be pointed downwardly or upwardly if desired by a user; also, the angle between the canopy 16 and the horizontal can be easily adjusted. The tension on the pivoting attachment member 126 is adjustable by using a fastener 128, e.g., a wing nut or the like. An end of rod 18 extends or passes through aperture 34, 36 and an end of rod 20 passes through aperture 38, 40 as best shown in FIG. 2. Also shown are photovoltaic cells 72 disposed on canopy 16, as previously disclosed with respect to FIG. 5, for generating electrical current along with the negative and positive electrical output wires 74, 76 along with an electrical connector 132, e.g., a USB as shown herein. Other previously disclosed items may also be shown.

Additional explanation of the present invention 10 is hereby provided with reference to all the figures wherein a lightweight canopy 16 for a boat 12 or other structure is disclosed which is fully adjustable up and down and rotatable in a 360 degree are around the stanchion 14 using a line 54 which would allow a fisherman 60 underneath the canopy to cast while standing or sitting underneath the canopy. The canopy 16 also provides protection from sunrays and rain. The canopy 16 may be made of a sheet of any suitable flexible material such as canvas, or nylon-like material, for example polyethylene, and is supported by a pair of flexible, PVC, fiberglass or graphite rods 18, 20 about ½ inch in diameter and the canopy may be attached to the rods using eyelets 30 with simple connectors 28 being run through the eyelets and around the rods. The inherent resilience of the rods 18, 20 bias the flexible fiberglass rods away from each other providing an effective amount of tension for maintaining the canopy in a stretched out disposition between the rods wherein the rods are each bowed outwardly away from each other. Front ends 32 of the fiberglass rods 18, 20 are each passed through holes 34-40 placed in opposite sides of an upright support PVC pipe or post 14 or like type support post or stanchion which support post is mounted onto a boat 12 or the like at its lower end. The canopy 16 would be easy to use and relatively inexpensive to manufacture. Also, the solid flexible, fiberglass rods 18, 20 may be jointed at 22 so the system could be broken down and folded for storage. Also, the rear ends of the flexible, fiberglass rods 18, 20 may be squeezed inwardly toward each other and tied to each other for securement using line 86 while the boat 12 is being operated at high speed in a forward direction. Also, in addition to watercraft 12, the canopy 16 could be mounted on many types of separate support structures such as picnic tables, trailers, pickup trucks, rear end of a vehicle, chairs, in the ground, a powered lift for hoisting workmen above the ground, or the like and there are many other applications for the present invention 10. Canopy 16 may be made of canvas or tarp-like material and may be waterproof. PVC post 14 may have an inner member about 1½ inch in diameter and an outer member about 2 inch in diameter. Ferrules 22 and T-connectors 26 could be made of fiberglass or aluminum or the like. In the event that the rear ends of rods 18, 20 droop excessively downwardly due to the weight of the rods and canopy 16, apertures 34, 38 may be placed in upright support 14 so as to be slightly higher than apertures 36, 40 so as to place the rods in a slight upward angle relative to the horizontal so that the weight of the rods and canopy pull the rods and canopy downwardly back to the horizontal; also the angle of the rods may be adjusted with the optional pivoting attachment member 126.

A summary of the present invention 10 making reference to FIGS. 1-11 follows wherein a canopy 16 for being mounted on a separate structure such as a watercraft 12, in the ground 58, in a rod holder 47, on a vehicle 106, on a chair 61, or on a table 110 and includes an upright support post 14 having upper and lower ends; first and second flexible rods 18, 20, each flexible rod having first, front 32 and second, rear ends; a first end of each flexible rod extending through an upper end of said upright support post, wherein each flexible rod is held firmly in apertures adjacent the upper end of the upright support post, wherein the flexible rods are substantially horizontally disposed and extend outwardly and away from the upright support post at an angle to each other in the range of 30 to 120 degrees and terminating at the seconds ends. The lower end of post 14 may be supported fixed in place on a structure with the upper end being rotatable with respect to the lower end, wherein the flexible rods are substantially horizontally disposed; and, a sheet of material having a first edge removably disposed on and attached to the first flexible rod and a second edge removably disposed on and attached to the second flexible rod so that the sheet of material forms a canopy extending between the first and second flexible rods and substantially from the first end of each flexible rod to the second end of each flexible rod. The sheet of material may include a solar cell fabric portion to permit the production of electrical energy on a sunlit day including a barrel connector 77 or USB 132. The flexible rods are constructed or configured so as to bias the rods away from each other providing an effective amount of tension for maintaining the sheet of material in a stretched out disposition. Wherein, the upright support post is adjustable in height using apertures 50 and a pin 52 and is rotatable in a 360 degree arc. Also, shown is a cross member 24 having first and second ends extending underneath the sheet of material 16 having the first end of the cross member connected to the first flexible rod and the second end of the cross member connected to the second flexible rod at 26. Wherein the first end 32 of each flexible rod 18, 20 is frictionally held in the plurality of apertures 34, 36, 38, 40 substantially perpendicular to the upper end of the upright support post 14. The angle formed between the rods 18, 20 (expected to be about 30 to 120 degrees) with respect to each other is effectively sized so that the rods become bowed enough to provide enough lateral tension to support the canopy 16 in a stretched out disposition.

Direction arrows are sometimes placed on the figures of this specification to indicate movement of the various parts and structures of the present invention 10.

I claim:

1. A canopy, comprising:
   a) an upright support post having upper and lower ends, wherein said lower end is supported on a structure;
   b) first and second flexible rods, each flexible rod having first and second ends;
   c) said first end of each said flexible rod removably attached adjacent said upper end of said upright support post, wherein said flexible rods are substantially horizontally disposed and extend outwardly from said upright support post at an angle to each other in the range of 30 to 120 degrees and terminating at said seconds ends;
   d) a sheet of material having a first edge removably attached to said first flexible rod and a second edge removably attached to said second flexible rod so that said sheet of material forms a canopy extending between said first and second flexible rods and substantially from said first end of each said flexible rod to said second end of each said flexible rod;
   e) said flexible rods being configured so as to bias the rods away from each other providing an effective amount of tension for maintaining the sheet of material in a stretched out disposition;
   f) wherein said upper end of said upright support post along with said flexible rods is rotatable to reposition said sheet of material; and
   g) a solar cell fabric portion disposed on said sheet of material to permit production of electrical energy.

2. The canopy of claim 1, wherein said structure is selected from the group consisting of a watercraft, a rod bolder, a vehicle, a table, a chair, and a ground.

3. The canopy of claim 1, said first end of each said flexible rod extending through and removably held in apertures adjacent said upper end of said upright support post.

4. The canopy of claim 1, further comprising a pivotable member being disposed on said upright support post so that said upper end of said upright support post is pivotable to permit the angle of the first and second flexible rods to be adjusted relative to the horizontal.

5. The canopy of claim 1, further comprising a cap being removably disposed on said upper end of said upright support post, said first end of each said flexible rod removably attached to said cap, wherein said flexible rods are substantially horizontally disposed and extend outwardly from said cap at an angle to each other in the range of 30 to 120 degrees and terminating at said seconds ends.

6. The canopy of claim 1, further comprising an electrical connector disposed on said solar cell fabric portion.

7. The canopy of claim 6, wherein said electrical connector is selected from the group consisting of a barrel connector, a cigar socket, and a universal serial bus.

8. A method for assembling a canopy, comprising the steps of:
   a) providing an upright support post having upper and lower ends, the lower end being supported on a structure;
   b) providing first and second flexible rods, each flexible rod having first and second ends;
   c) mounting the first end of each flexible rod adjacent the upper end of the upright support post so that the flexible rods are removable and substantially horizontally disposed, the rods extending outwardly at an angle to each other in the range of 30 to 120 degrees and terminating in free second ends;
   d) extending a sheet of material between the first and second flexible rods wherein a first edge thereof is removably attached to the first flexible rod and a second edge thereof is removably attached to the second flexible rod so that the sheet of material forms a canopy extending between the first and second flexible rods and substantially from the first end of each flexible rod to the second end of each flexible rod, wherein the flexible rods bias away from each other providing an effective amount of tension for maintaining the sheet of material in a stretched out disposition;
   e) wherein the upper end of the upright support post along with the flexible rods are rotatable so as to reposition the sheet of material; and
   f) disposing a solar cell fabric portion on the sheet of material for producing electrical energy.

9. The method of claim 8, wherein the structure is selected from the group consisting of a watercraft, a rod holder, a vehicle, a table, a chair, and a ground.

10. The method of claim 8, further comprising the step of extending the first end of each flexible rod through apertures adjacent the upper end of each upright support post, wherein each flexible rod is frictionally held in its respective aperture.

11. The method of claim 8, further comprising the step of providing a pivotable member on the upright support post so that the upper end of the upright support post is pivotable to permit the angle of the first and second flexible rods to be adjusted relative to the horizontal.

12. The method canopy of claim 8, further comprising the step of providing a cap being removably disposed on the upper end of the upright support post, the first end of each flexible rod removably attached to the cap, wherein the flexible rods are substantially horizontally disposed and extend outwardly from the cap at an angle to each other in the range of 30 to 120 degrees and terminating at the seconds ends.

13. The method canopy of claim 8, further comprising the step of providing an electrical connector on the solar cell fabric portion.

14. The method canopy of claim 13, wherein the electrical connector is selected from the group consisting of a barrel connector, a cigar socket, and a universal serial bus.

* * * * *